Dec. 25, 1934. F. BÖSSNER ET AL 1,985,441
PRODUCTION OF GASES POOR IN CARBON MONOXIDE
Filed April 24, 1931   3 Sheets-Sheet 3

Inventors:
Franz Bössner
Carl Marischka
By R. W. Dommers

Patented Dec. 25, 1934

1,985,441

UNITED STATES PATENT OFFICE 1,985,441

PRODUCTION OF GASES POOR IN CARBON MONOXIDE

Franz Bössner and Carl Marischka, Vienna, Austria

Application April 24, 1931, Serial No. 532,658
In Austria April 28, 1930

1 Claim. (Cl. 48—204)

For the purpose of reducing the percentage of the poisonous carbon monoxide (CO) in a gas mixture, or for eliminating same entirely (depoisoning of the gases) well known chemical processes are made use of, which are carried out by means of lime according to the following equations:

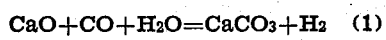
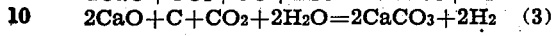

$$CaO+CO+H_2O=CaCO_3+H_2 \quad (1)$$
$$2CaO+CO_2+CO+H_2O=2CaCO_3+H_2 \quad (2)$$
$$2CaO+C+CO_2+2H_2O=2CaCO_3+2H_2 \quad (3)$$

These reaction processes take place at about 500° C. For regenerating the reaction mass, same is heated to about 800 to 900° C:

$$CaCO_3=CaO+CO_2 \quad (4)$$

Our present invention relates to a process for decreasing the CO content of water-gas, or of gaseous mixtures containing water-gas poor in CO of the class wherein the CO-contents are transformed into $CO_2$ with the aid of a reaction of CO and of steam in the presence of a reacting mass containing CaO and the main object of our invention substantially consists in that the sensible heat produced during a part of the gas-generating process is utilized for the said reaction and for the regeneration of the reacting mass, whereby the production of gas poor in CO is rendered economical. The heat utilized in this matter comprises not only the sensible heat of the water-gas itself, but also that of the hot blast gases produced during the so-called "blast" period.

It is not the purpose aimed at by the invention to entirely remove the CO out of the gases or to depoison the latter absolutely, this—by the way—being quite impossible as nearly every gas contains other poisonous stuffs besides the CO. The purpose of the invention is however to produce in an economical manner a city gas sufficiently poor in CO for practical purposes without altering in a considerable degree its valuable properties as a fuel.

Gas poor in CO is produced according to the well known intermittent method, which has two alternating periods. The gas producer plant is changed insofar as either the combustion chamber (heat storage), the carburettor, the superheater may be used for receiving the reacting mass or this mass may be introduced into another chamber separated from the gas producer so that the transforming processes according to the chemical reactions (1) to (3) and the regenerating process according to (4) will take place in this chamber.

During the water-gas generating period the reactions take place at about 500° C., whilst in the "hot blast" period the reacting mass is regenerated at about 800-900° C.

In the so-called continuous water-gas producing process the reaction for the transformation of the CO and the reactivation of the reacting mass may in some cases be brought about by an alternating excess of steam and air in the gas producer or in the chamber which contains the reacting mass. The temperatures required for the reaction viz. 500–600° C. and for the reactivation viz. 800–900° C. may be regulated without difficulty by means of this alternating excess of steam and air, without having to abandon the principle of continuity in gas production.

The heating of the reacting may also be achieved according to the regenerative principle as will be described later on. This process is best carried out by means of two chambers, in which the reacting mass is placed according to this invention. The heating of the regenerative chambers may be carried out either by means of the inherent heat of the gases increased by the heat resulting from the combustion of a part of the gases produced, said combustion being performed in the regenerator chambers.

As mentioned above the execution of the reactions on which the process is based, with the aid of CaO as reagent, is generally known. It is a new feature, however, that this substance is already used in the gas producing plant during the production of the gas itself, the resulting product being a gas poor in CO and rich in $H_2$. It has proved advantageous to use as a reacting mass a mixture of carbonates of calcium, magnesium and iron. The use of ankerite, that is, a natural mixture of carbonates of calcium, magnesium and iron, has been found particularly advantageous.

In the following the devices required for carrying out the process according to invention are described on principle by showing different embodiments of the inventive thought. These devices are insofar a substantial part of the invention as the correct order of the apparatus is a determining factor for the success of the process and for its economical execution, i. e. that the effect desired can only be attained if the chamber containing the reacting mass for the CO transformation is inserted into the plant at the correct place. The gas producing plant may be of any type, but the type preferred for the execution of the process according to the invention is the combined gas and steam producer. By means of these gas producers the process according to the invention will yield the best technical and economical results.

The Figures 1, 2 and 3 are side elevational views partially in section of three different gas producing plants in which the invention can be realized.

Figure 1:
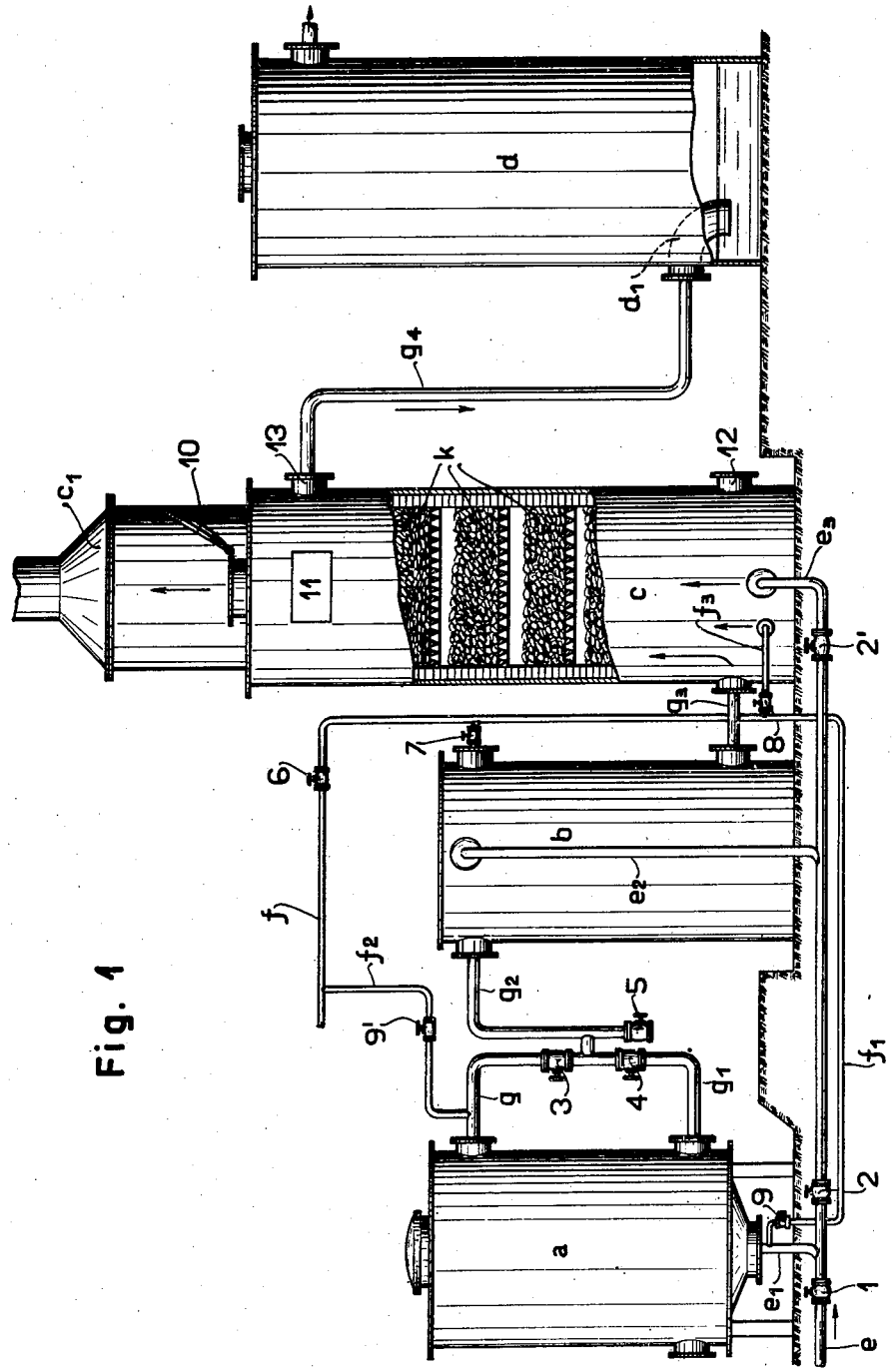
Fig. 1 shows a plant using a special heat storage chamber.

The device illustrated in Fig. 1 shows by way of example a series arrangement of an ordinary brick lined or water cooled water gas generator $a$, a combustion chamber $b$ (ignition chamber, heat storage, carburettor) and a chamber $c$, which contains the reacting mass $k$ consisting of CaO and the like for the transformation of CO into $CO_2$ and the production of $H_2$. Above this chamber there is placed a chimney $c_1$. The last unit in this set of apparatus is the scrubber $d$, the bottom part of which contains the water seal $d_1$. The operation is the following:

There are two alternating periods viz. the "air blast" and the "water-gas generating" whereby the latter operation may either be performed exclusively from below or alternately from below or from above.

The air required for the "blast" is passed through the air (or blast) pipe $e$ and $e_1$ respectively and enters the producer $a$ by way of the blast slide valve 1 opened, whilst the hot gases flow through the opened gas slide valve 3 and through the pipes $g$ and $g_2$ into the heat storage $b$. Here they give up a part of their heat to the refractory bricks of the checker-work in such a manner that some secondary air, coming out of the blast conduit $e_2$ is permitted to enter the heat storage through the opened slide valve 2, which air will burn the CO contained in the gases, produced during the "blast" period. Then the hot gases of combustion will flow out of the heat storage and enter the chamber $c$ through $g_3$, the chamber $c$ containing, in the usual arrangement the reacting mass, which during the subsequent water-gas generating period is necessary for the transformation of CO into $CO_2$ accompanied by the production of $H_2$, according to the invention. Then the "blast" period gases pass through the opened flap valve 10 into the chimney $c_1$. If desired, it is possible to introduce air into the chamber $c$ through the opened slide valve 2 and the blast pipe $e_3$, this air being used to burn there the rest, if any, of the CO left in the combustion gases of the "blast" period and to heat the reacting mass $k$ consisting for example of ankerite up to the necessary temperature of transformation. During the "blast" period the reacting mass, which in the course of the preceding water-gas generating period had absorbed the $CO_2$ is regenerated, i. e. rendered active again. The $CO_2$ produced escapes through the chimney $c_1$. This shows that in the course of the "blast" period the reacting mass becomes again active and capable of absorbing $CO_2$.

After each "blast" period there is a "gasing" period. The operation is the following:

The air flowing through the blast pipes $e$, $e_1$, $e_2$ and $e_3$ to the apparatus $a$, $b$, $c$ is stopped by closing the blast slide valves 1, 2 and 2'. The gas slide valve 3 remains open, when the water-gas generation is effected from the bottom whilst the gas slide valve 4 remains open, when the water-gas generation is effected from above. The gas slide valve 5 is only used for removing the dust. The water-gas generation consists in steam being introduced into the gas producer (generator), either from "above" through the conduits $f$ and $f_2$ and the opened steam slide valve 9' or from "below" through the steam conduits $f$ and $f_1$ and the opened steam slide valves 6 and 9.

In case of a "water-gas generation from above" the water gas flows out of the gas producer (generator) $a$ through the gas pipes $g_1$ and $g_2$ into the heat storage $b$ and out of the latter through the conduit $g_3$ into the chamber $c$, the flap valve 10 of which is closed. From the chamber $c$ the water gas, poor in CO and rich in $H_2$, passes through the opening 13 into the conduit $g_4$ and thence through the safety water-seal $d_1$ into the scrubber $d$. When "water-gas generation from below" the way of the gases is the same with the exception that the water gas produced does not flow through conduit $g_1$, but through conduit $g$.

In order to further as far as possible the transformation of CO into $CO_2$ and to increase the quantity of $H_2$ obtained, steam is introduced during the water-gas generation into the heat storage $b$ by opening the steam slide valve 7 and into the chamber $c$ out of the steam conduit $f_3$ by opening the steam slide valve 8.

As soon as, at the end of the water-gas generation period, the temperature in the gas producer (generator) has fallen to an extent in which the quality of the water gas produced is not satisfactory any more, the water-gas generation is stopped and the next "hot blast" period begins. During this "blast" period the reacting mass $k$ is regenerated i. e. rendered active again.

The renewal of the mass takes place after long operating periods in such a manner that the mass to be exchanged is removed through the opening 12, whilst the new mass is introduced into the chamber $c$ through the opening 11.

The arrangement illustrated in Fig. 2 shows again the connection of a combined water gas and steam producer, with a chamber $c$. Instead of the fire tubes of the boiler the combined gas and steam producer employed in this case is provided with a fire brick checkerwork which occupies the outer annular space of the generator (gas jacket) and acts as heat storage. According to the arrangement shown in Fig. 2 the separate combustion chamber $b$ as per Fig. 1, has been placed into the generator itself. First of all, the raw material contained in the gas producer (generator) shaft $a$, which is formed by tubes $a_1$ gives up its heat to the tube boiler $a_1$. Furthermore a certain quantity of heat is transferred to the tubes from the gas jacket $b$ (outer annular space of the generator) by way of radiation from the firebrick checker work provided there, heated during the "blast" period.

This feature is of advantage for the process according to the invention insofar as not the whole heat produced during the "blast" period of the water gas process is exclusively used for the production of steam; a sufficient quantity of heat being reserved for regenerating the reacting mass $k$ contained in the chamber $c$. Nevertheless a sufficient quantity of steam is produced in the gas jacket (outer annular space of the gas producer) by means of the radiation from the fire brick checker work so as not only to meet the requirements of the water gas process but to increase also the percentage of hydrogen in the gas by supplying steam to the chamber $c$.

According to this arrangement the mode of operation is the following:

As in the arrangement according to Fig. 2 "blast" periods alternate with water-gas generation periods, the "blast" operation may be carried out either only from below or alternately from above or from below. With the blast slide valve 1 opened the air required for the "blast" operation passes from the blast pipe $e$ through $e_1$ into the gas producer shaft $a$. The gas slide valve 3 is closed whilst the gas slide valve 14 is opened at $g_2$. The "blast" gases coming out of the shaft $a$ pass through the conduit $g_2$ into the outer annular space $b$ or gas jacket of the generator, which is occupied by a fire brick checker work acting as a heat storage. With the blast slide valve 2 opened, combustion air is introduced through the conduit $e_2$ into the gas jacket $b$ which is used to burn the "blast" gases thus heating not only the heat storage but also the tubes $a_1$ forming the producer shaft. Then the combustion gases of the "blast" gases will flow, together with the still unburnt gases contained in the same space, through the opened gas slide valve 15 and through the conduit $g_3$ to the chamber $c$. As to the rest the mode of operation is the same as that described in connection with Fig. 1, so that further explanations are not needed. During the "gasing" period steam is taken out of the secondary boiler $a_2$.

Figure 2:
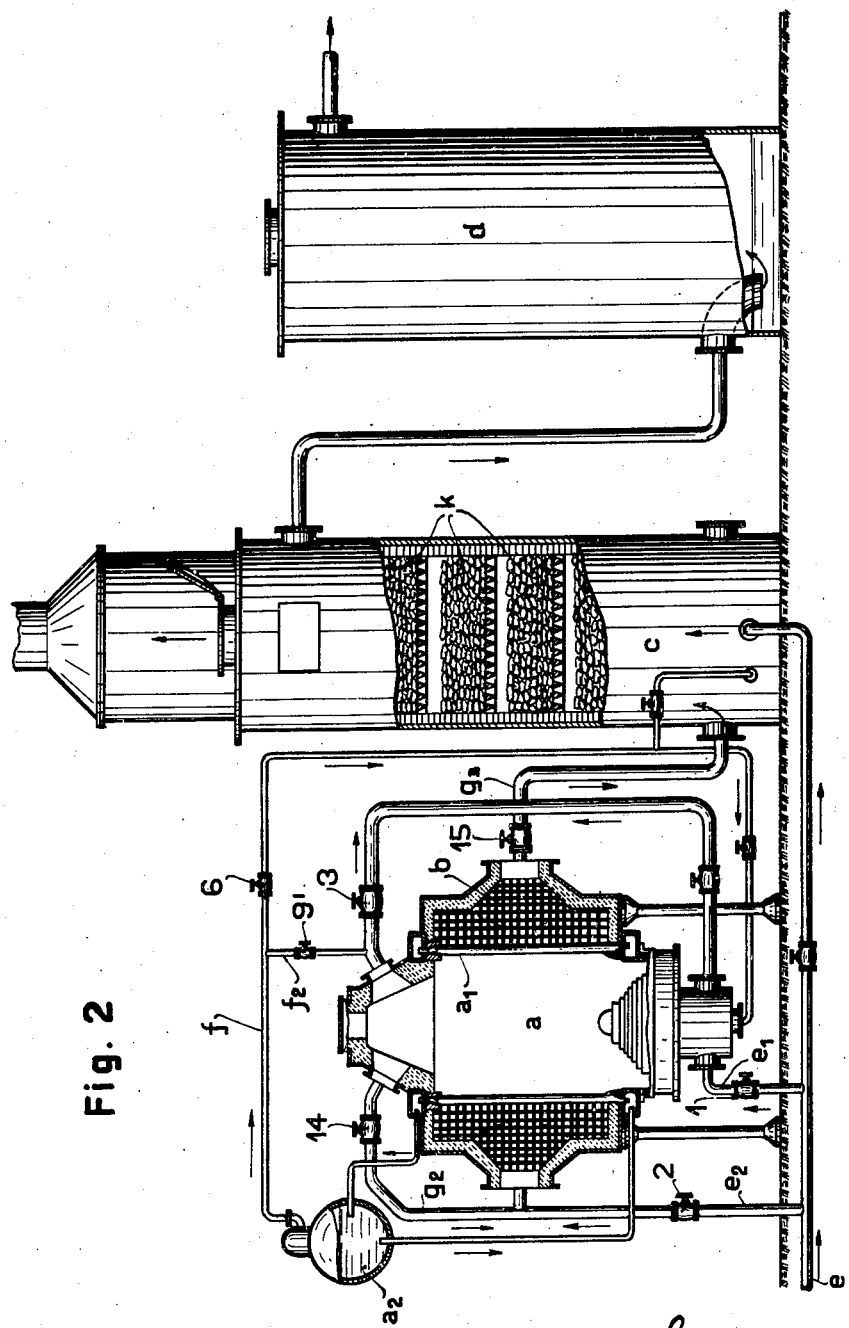
Fig. 2 shows a plant with a heat storage chamber placed within the gas generator itself.

It goes without saying that the embodiments of devices required for carrying out the process in accordance with the invention shown in the Figs. 1 and 2 by way of example may be subjected to various alterations. The essential point is that in all possible combinations there must always be a chamber $c$ containing the reacting mass $k$, which is indispensable for carrying out the process.

Figure 3:
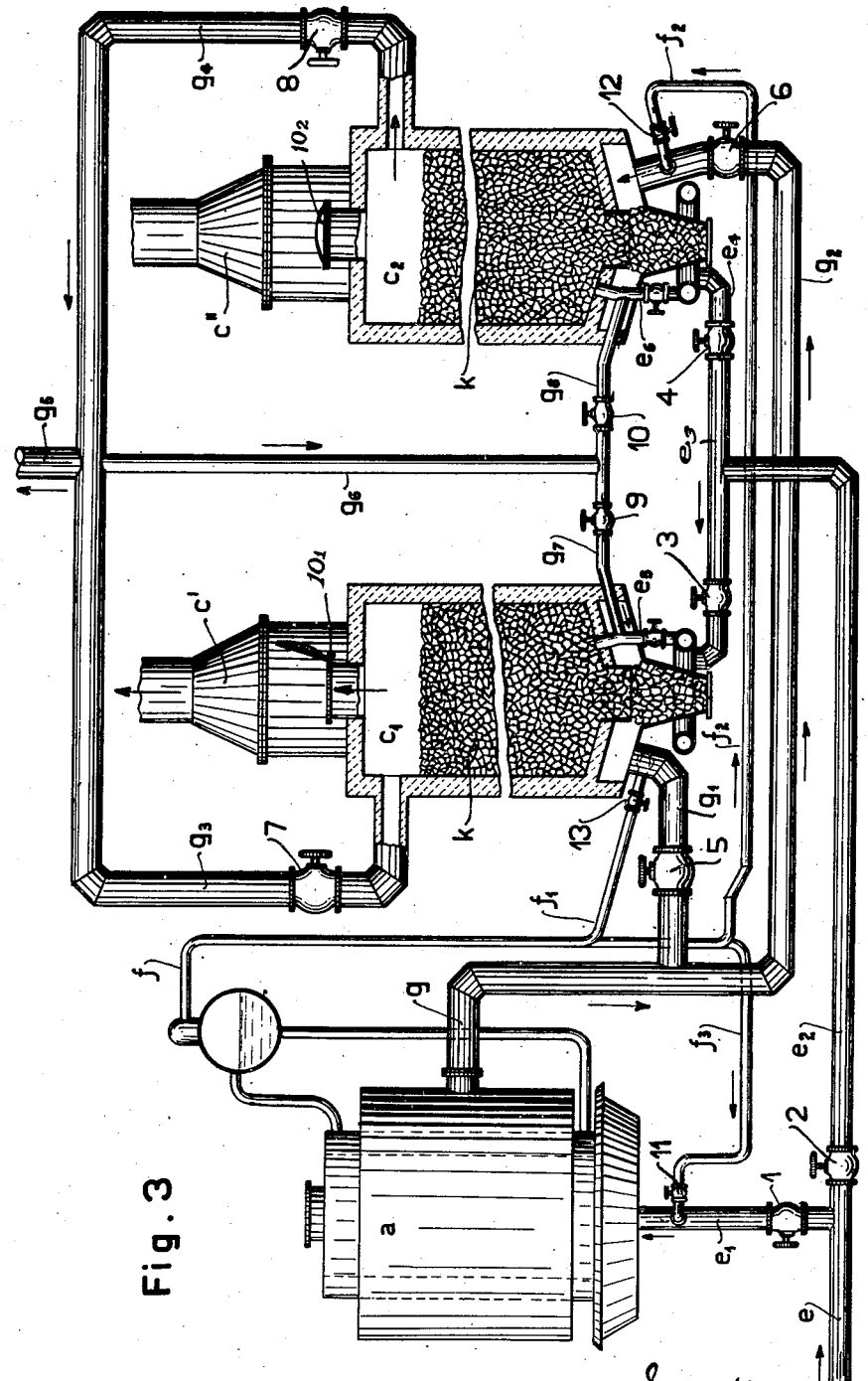
Fig. 3 shows a plant in which the reacting mass is provided in two chambers alternatively used for the reaction of the regeneration of the reacting mass respectively.

The device shown in Fig. 3 is an embodiment of the CO transformation process according to the invention applied to the continuous (non intermittent) water gas producing process carried out by utilizing the regenerating principle. In the main the plant is composed of a gas producer (generator) i. e. a generator-steam boiler $a$ for the continuous production of a gas and of two similar regenerator chambers $c_1$ and $c_2$ containing the reacting mass $k$, which chambers are in this embodiment provided with an internal heating arrangement utilizing the inherent heat of the gas produced and an additional heating device for the periodical combustion of partial quantities of the gas. From the blast pipe $e$ a branch $e_1$ leads to the gas producer, the branches $e_2$, $e_3$, $e_4$ and further the branches $e_5$, $e_6$ and so forth lead to the regenerator chambers.

For carrying out the process according to the invention these branches are fitted with shut-off devices 1, 2, 3, 4. From the gas producer the gas produced which contains the ordinary percentage of CO is conducted to $c_1$ and $c_2$ through the pipes $g$, $g_1$, $g_2$ the necessary connections being established by systematically opening and closing the shut-off members 5 and 6 provided in the gas lines. Furthermore, there is a steam line $f$ having two branches $f_1$, $f_2$ which leads from the gas producer to $c_1$ and $c_2$, another branch $f_3$ leading from $f$ to the gas producer itself below the grate (undergrate steam blast). At $f_1$, $f_2$ and $f_3$ the shut-off members 11, 12 and 13 have been provided for the systematical admission and shutting off the steam flow for carrying out the process according to the invention. The gas conduits $g_3$, $g_4$ and $g_5$ are used for carrying off the gas out of $c_1$ and $c_2$ after the transformation process is completed. At the points $g_3$ and $g_4$ there are also shut-off members 7 and 8 permitting of a systematical opening and closing for carrying out the process according to the invention. From $g_5$ there branches off a line $g_6$ provided with the shut-off members 9 and 10; $g_6$ being used for the admission of a part of the gas produced (the CO contents of which have in this case already been transformed), which part is periodically burnt in $c_1$ and $c_2$ for keeping the reacting mass $k$ at the hight of the reacting temperature. The combustion gases, which also contain the $CO_2$ absorbed out of the reacting mass during its regeneration, escape out of $c_1$ and $c_2$ through the opened valves into the chimneys $c'$ and $c''$. The process of transformation of the CO into $CO_2$ accompanied by the increase of the $H_2$ contents and the subsequent driving out of the $CO_2$ out of the reacting mass takes place in the device above described as follows:

At $a$ there is a continuous production of water gas which, still in a hot state, flows either through $c_1$ or $c_2$ where it transforms its CO contents into $CO_2$ and $H_2$ by being brought into contact with $k$ in the presence of steam and at a temperature of 500–600° C. which is required for the reaction. Whilst the transformation takes place for instance in $c_2$, the mass $k$ contained in $c_1$ is regenerated at the required temperature of 800–900° C. that is to say the mass $k$ is freed from the $CO_2$ previously absorbed. After a certain time viz. when the optimal temperatures are no longer prevailing in chambers $c_1$ and $c_2$ the whole arrangement is reversed so that the reaction takes place in $c_1$ and the regeneration of the reacting mass in $c_2$. This alternating process is continuously repeated. The position of the shut-off members (for gas, air and steam) will of course be different in each period for $c_1$ and $c_2$, the respective positions being:

(a) reaction in $c_2$ and regeneration in $c_1$.

Open: 6, 8, 12, 3, 9 and flap valve $10_1$
Closed: 5, 4, 10, 13, 7 and flap valve $10_2$ (b) reaction in $c_1$ and regeneration in $c_2$.

Open: 5, 7, 13, 4, 10 and flap valve $10_2$
Closed: 3, 9, 6, 12, 8 and flap valve $10_1$.

What we claim is:

A process for decreasing the CO-contents of water-gas, and of gaseous mixtures containing water-gas, which comprises providing a reacting mass consisting of ankerite within a chamber, passing the water-gas together with steam through said reacting mass for transforming the CO-contents of the water-gas into $CO_2$, and intermittently heating said reacting mass to effect said transformation and the regeneration of the reacting mass respectively.

FRANZ BÖSSNER.
CARL MARISCHKA.